Nov. 7, 1944.  W. C. BUTTNER  2,362,352
TWO-STAGE REGULATOR
Filed Dec. 12, 1940  5 Sheets-Sheet 2

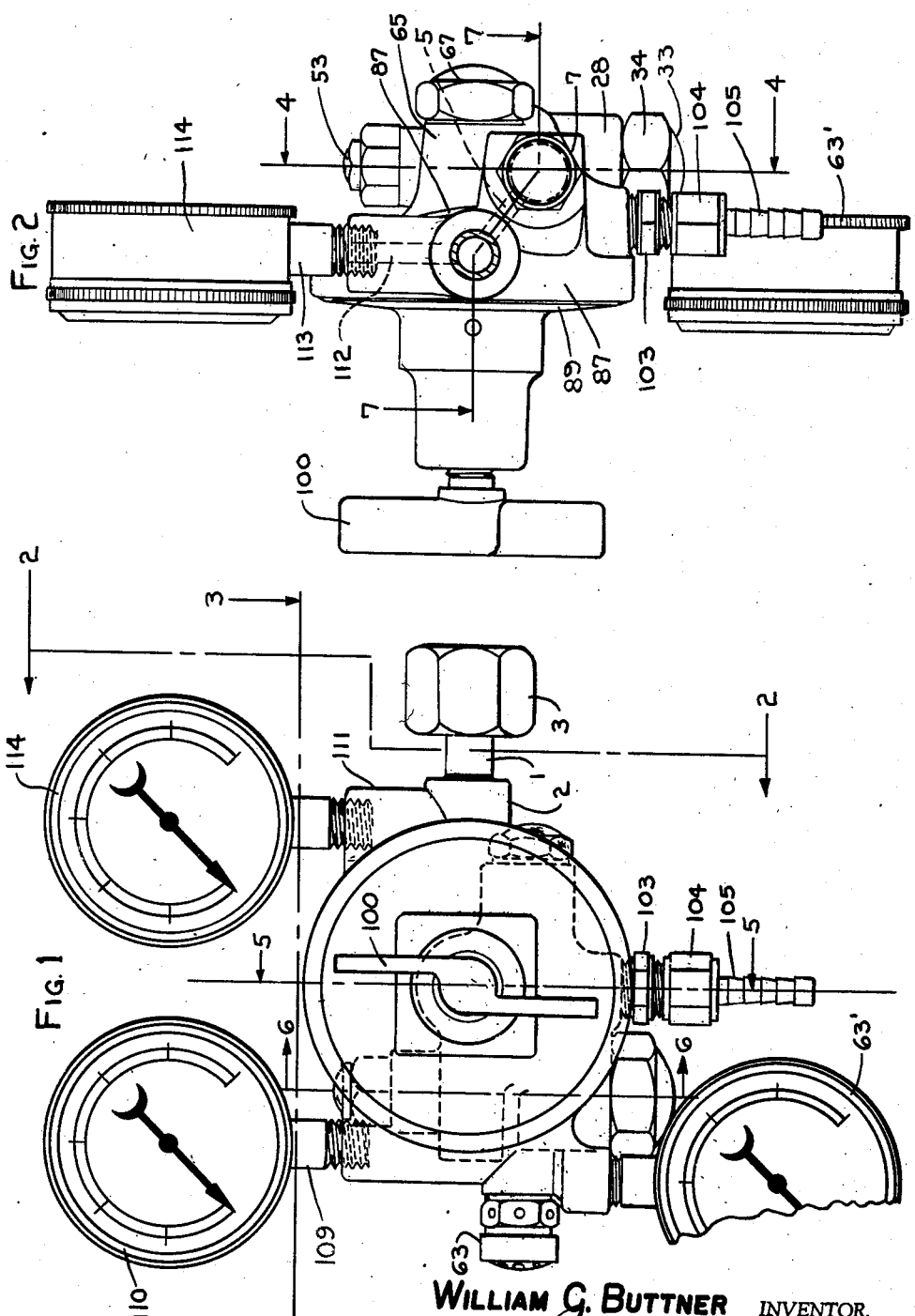

WILLIAM C. BUTTNER
INVENTOR.
BY Watson D. Harbaugh
HIS ATTORNEY

Nov. 7, 1944.  W. C. BUTTNER  2,362,352
TWO-STAGE REGULATOR
Filed Dec. 12, 1940  5 Sheets-Sheet 3
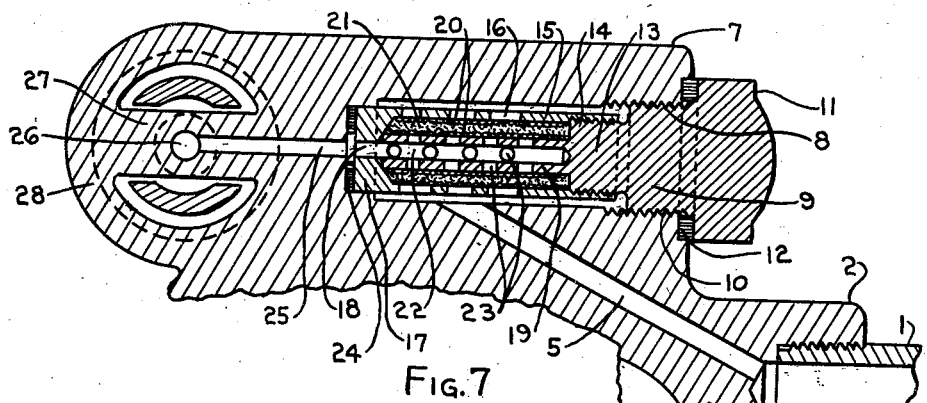
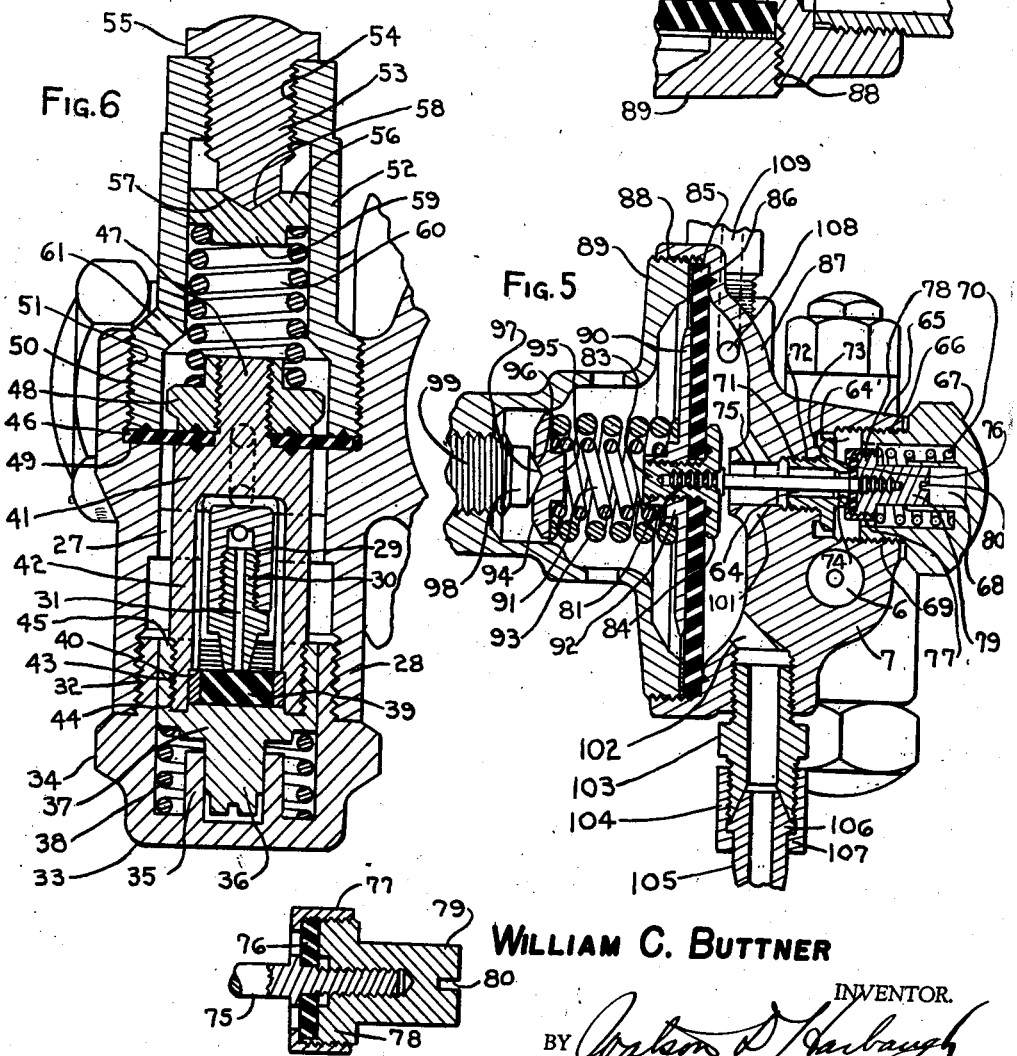
WILLIAM C. BUTTNER
INVENTOR.
BY
HIS ATTORNEY

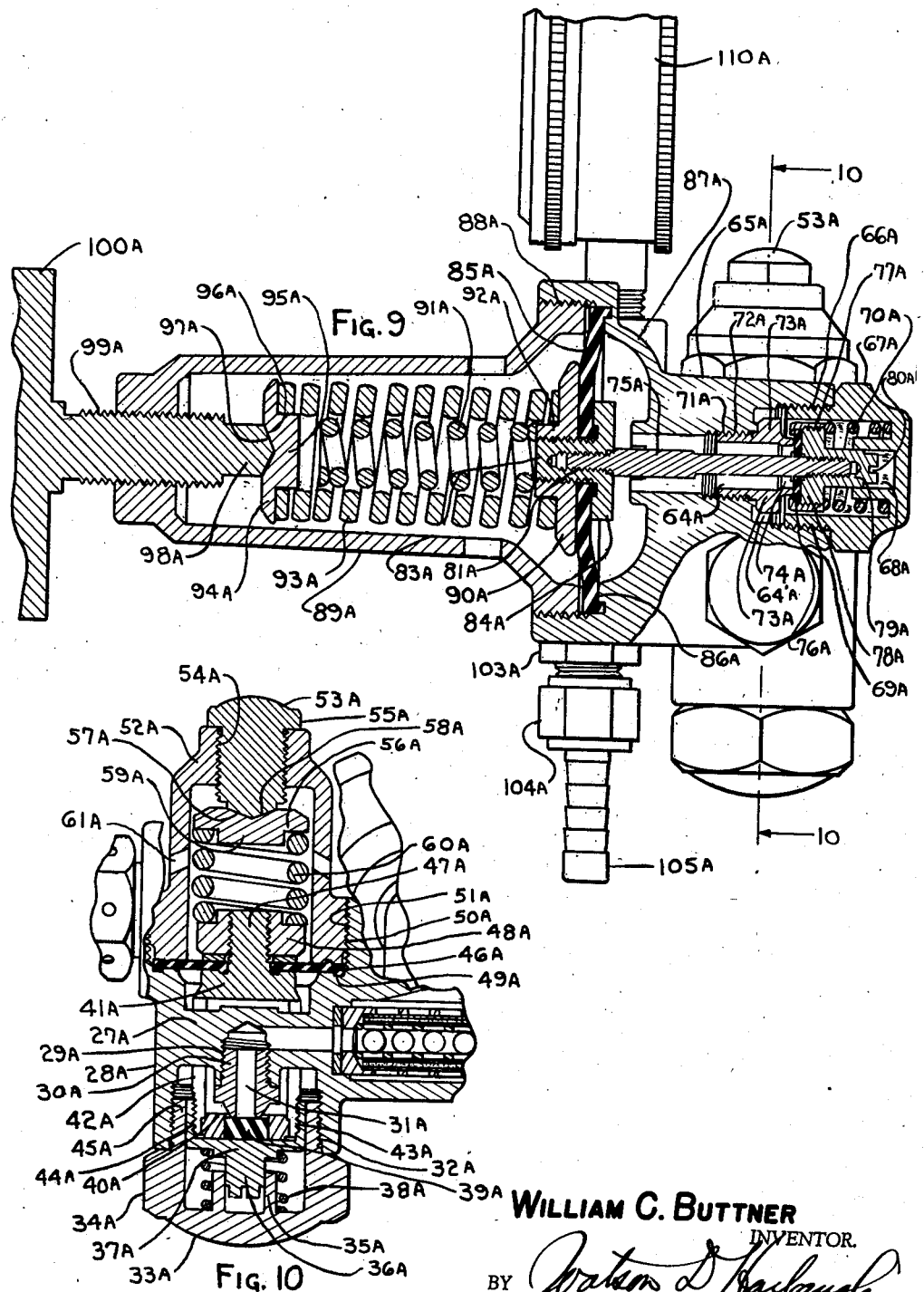

Nov. 7, 1944. W. C. BUTTNER 2,362,352
TWO-STAGE REGULATOR
Filed Dec. 12, 1940 5 Sheets-Sheet 5

WILLIAM C. BUTTNER, INVENTOR.

HIS ATTORNEY

Patented Nov. 7, 1944

2,362,352

UNITED STATES PATENT OFFICE 2,362,352

TWO-STAGE REGULATOR

William C. Buttner, Winnetka, Ill.

Application December 12, 1940, Serial No. 369,881

21 Claims. (Cl. 50—23)

The present invention relates generally to pressure reduction regulators and more particularly to regulators providing two stages of pressure reduction in a unitary assembly.

The present invention is a continuation in part of the William C. Buttner application, Serial No. 170,419, filed October 22, 1937, for a Two-stage regulator.

One of the objects of the invention is to provide an improved design for a high capacity, high pressure two-stage regulator which is compact, neat and performs with greater efficiency; furthermore, a regulator which is easily handled and extremely rugged for heavy and hard usage.

Another object of the invention is to provide an improved forged body form for a regulator which can be easily machined to provide ready assembly of all parts in various combinations for different installations and adaptations.

Another object of the invention is to provide an improved relationship of elements to maintain uniform adjustment conditions during decrease in tank pressures over long periods of operation, including a fineness of adjustment upon the output approaching a curve of straight line function throughout the expected pressure working range.

Another object is to provide a pressure regulator in which an improved arrangement and means are provided to prevent seat ignition, i. e. the burning of the valve seats or valve parts within the regulator.

Another object is to provide a means as close to the first stage regulator of a two-stage regulator as possible which inhibits the flow of suddenly compressed fluid to delay compression of residual gases long enough to permit dissipation of sufficient terminal heat of compression to reduce the temperature of the suddenly compressed gases below the ignition point.

Another object is to provide a safety screening attachment which serves not only the purpose of preventing seat ignition but also prevents the entrance of foreign matter into the regulator and protects all of the working parts against failures due to dirt.

Another object is to provide such a safety device which is readily removable for inspection or repair.

A further object is to provide a construction which can be serviced with a conventional adjustable wrench and a screw driver.

These being among the objects of the present invention, other and further objects will appear from the drawings, the description relating thereto and the appended claims.

Referring now to the drawings:

Figure 1 is a front elevation of one form of the regulator;

Figure 2 is a side elevation with parts taken in section at line 2—2 of Figure 1;

Figure 5 is a generally vertical transverse section taken at line 5—5 of Figure 1, with parts omitted;

Figure 6 is a generally vertical sectional detail, enlarged, taken at line 6—6 of Figure 1, illustrating on an enlarged scale the first stage regulator;

Figure 7 is a generally transverse sectional detail on an enlarged scale taken at 7—7 of Figure 2 and illustrating in detail the removable strainer assembly;

Figure 8 is an enlarged section illustrating the details of the valve assembly at the second stage regulation;

Figure 9 is a view similar to Figure 5 illustrating another embodiment of the invention constructed for extra high capacity and pressure for heavy cutting; and Figure 10 is a view similar to Figure 6 showing a section of the first stage pressure reduction regulator employed as part of the embodiment illustrated in Figure 9;

Like parts are designated by like characters throughout the specification and drawings and corresponding parts in the modified embodiment are indicated with the suffix a.

Figure 3:
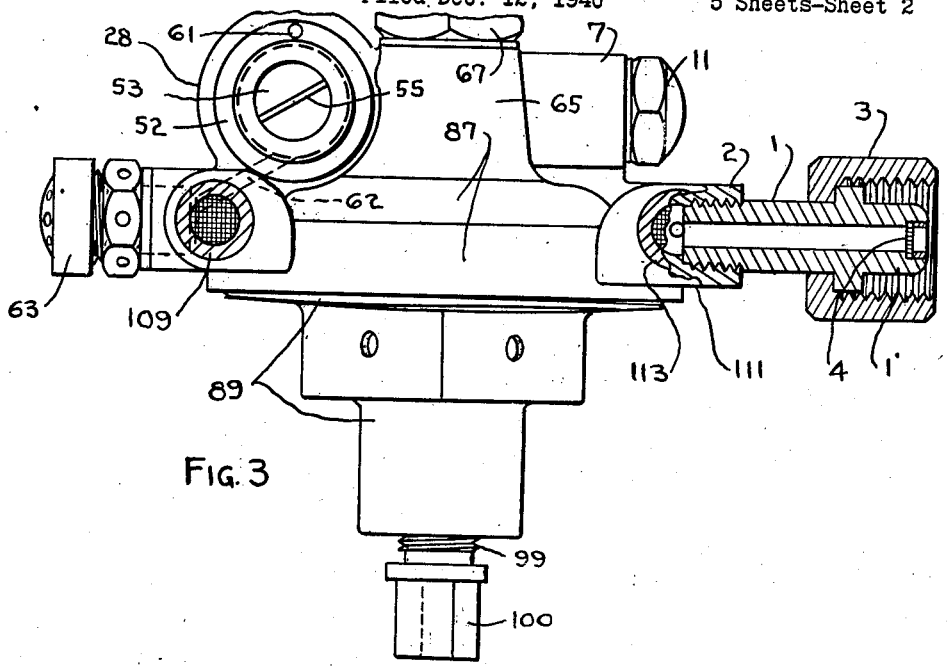
Figure 3 is a top view with parts taken in section at line 3—3 of Figure 1.

As shown in the drawings, the invention is embodied in a two-stage pressure regulator in which means are provided for the admission of fluid under pressure and the reduction of that pressure so that discharge is accomplished from the device with the fluid at a reduced pressure. Two pressure gauges are shown to indicate the entering pressure and the discharge pressure. The latter is the pressure present for the second stage reduction. A connection is provided to which a third gauge may be attached to indicate the pressure of the first stage of reduction. As shown in the figures, this third gauge is shown below the regulator body in Figure 1.

The regulator comprises an irregularly shaped, preferably forged brass body having a central circular portion 87 tapering outwardly at 65 upon the back side and two approximately semi-cylindrical bosses 7 and 28 disposed at right angles to each other in the form of an L which is disposed with the tapered portion 65 disposed in the included angle with the mutually supported walls flared into each other and the axes of the semi-cylindrical bosses disposed parallel with the plane of the central circular portion.

The machining of the body will be described in relation to parts assembled therewith and the parts will be described with respect to the direction taken by the entering fluid.

Mounting

An inlet connection or nipple 1 is secured as by soft solder to an inlet boss 2 in sealed relationship and is provided with a swivel inlet nut 3 by means of which the regulator as a whole may be connected and supported with respect to a tank that provides a source of fluid under pressure. The spherical head 1' (Fig. 3) has a cylindrical portion behind it which is sufficient to provide the necessary support for both the regulator and connected hose.

A screen 4 is positioned at the outer end of the inlet nipple 1 where it is accessible for cleaning and to prevent the entrance of foreign matter into the regulator body.

Main strainer construction

From the portion 2 a drilled passage 5 runs to a chamber 6 which may be generally cylindrical in shape as formed in the boss 7. The outer end of the chamber 6 is open and is internally threaded as at 8 (Fig. 4) to receive a strainer assembly (Fig. 7) which includes a strainer body 9 externally threaded as at 10 to engage the threads 8. The strainer body 9 may be provided with a hex-shaped head 11 to receive a wrench for its insertion and removal. A washer 12 preferably of soft aluminum is provided to prevent leakage at the joint.

Inwardly of the portion 9 the strainer body is reduced as at 13 and is externally threaded as at 14 to receive a hollow shell 15 which is itself provided with perforations 16 and the partial end closure 17 which is perforated as at 18. Positioned within the shell 15 and engaging a reduced portion 19 formed preferably integrally with the strainer body and as an extension of the reduced portion 13, is a double screen assembly 20 which, as shown particularly in Figure 7, comprises an inner and outer screen and an intermediate body of inert filtering absorbent 21. The member 19 is provided with a longitudinal chamber 22 open at its end in line with the perforation 18 and is provided with a plurality of lateral openings, 23. A second soft aluminum washer 24 may be provided and when present will ordinarily be contacted by the inner end of face of the member 17 to prevent leakage past this member.

First stage pressure reduction

Figure 4:
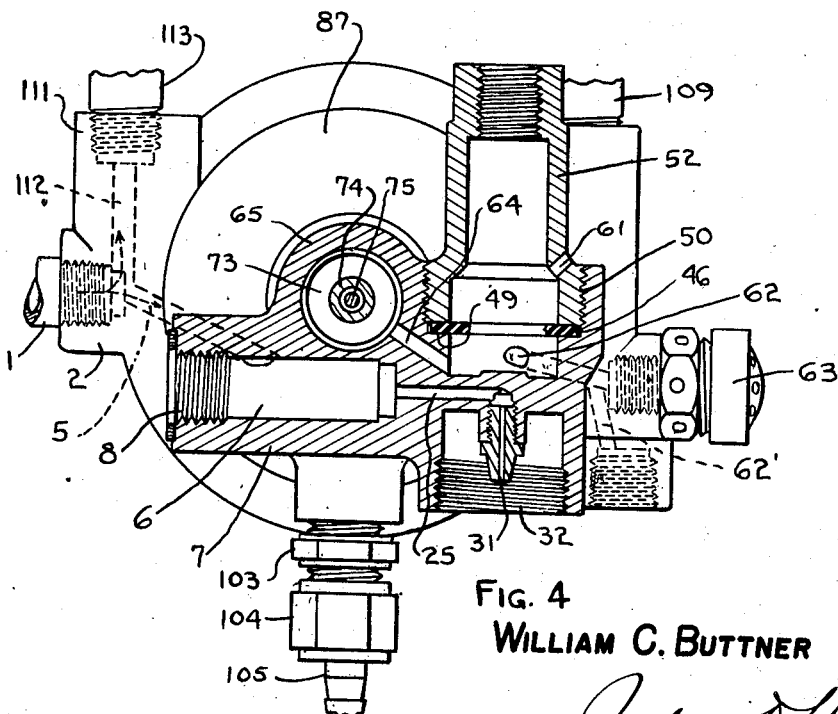
Figure 4 is a generally vertical section taken at line 4—4 of Figure 2, with parts omitted.
Figure 11:
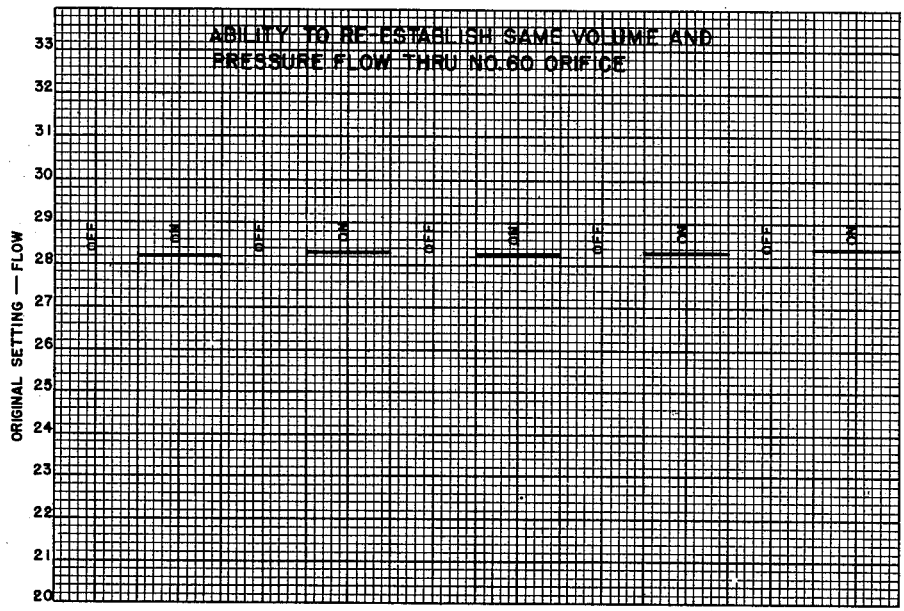
Figure 11 is a chart showing the ability of the embodiment illustrated in Figure 1 to establish same volume and pressure through #60 orifice after momentary shut-off.

Thus, fluid entering through the passage 5 passes through the perforations 16 to the interior of the shell 15 and through the strainers and the absorbent lining, thence through the perforations 23, the passage 22, the perforations 18 and into a passage 25 which communicates with an angularly disposed passage 26 formed in a bridge portion 27 which may be formed integrally in the boss 28 that forms the housing of the first stage valve compartment. The passage 26 is enlarged and preferably internally threaded as at 29 to receive a correspondingly shaped and threaded nozzle 30, which is provided with a central perforation or passage 31 drilled out with a #48 drill. The overall diameter of the port is .116" and the margins are polished to a .010" radius. The lower or outer end of the boss 28 in the positions shown in Figures 4 and 6 is internally threaded as at 32 to receive a back cap 33, provided with portion 34 to receive a hand tool for insertion and removal.

The cap 33 is generally cylindrical on its interior and may have integral with it an inwardly extending cylindrical well 35 within which is received a cylindrical project 36 of a center piece 37. A helical back cap spring 38 is positioned about the extension 35 and bears at one end against the center piece 37. The spring 38 is preferably made of stainless steel providing an approximately 25 lb. load at $9/16''$ compressed length. A hard rubber valve seat member 39 is carried upon the inner face of the center piece 37, a white metal seat being substituted for certain gases, and the seat is held in place by a retainer 40 which holds the seat in contact with the discharge end of the nozzle 30.

The seat 39 is supported with respect to the nozzle by a yoke body 41 provided with yoke arms or branches 42 which, as shown in Figure 6, are disposed astride the bridge 27 and threaded externally as at 43 at their lower ends to engage corresponding threading 44 on the interior of a portion 45 which is an extension of and preferably made integrally with the center piece 37.

At its upper end, the yoke body 41 is reduced and threaded as at 47 to extend through a perforated diaphragm 46 and receive a diaphragm lock nut 48 which secures the diaphragm in place. The diaphragm is approximately $1 \frac{59}{64}''$ in diameter and $\frac{1}{16}''$ thick, and at its outer edges rests upon a machined ledge or shoulder 49 formed as a part of the boss which provides a working diameter of $\frac{7}{8}''$ for the diaphragm. The boss 28 is internally threaded above the ledge 49 as at 50 to receive the correspondingly threaded end 51 of a bonnet 52 which is hollow and closed at its upper end by an adjusting screw 53 threaded as at 54 to engage mating threads upon the bonnet 52. The adjusting screw may be slotted or hex headed as at 55 for adjustment by a hand tool. A spring button 56 is mounted within the hollow bonnet 52. At one end it may be provided with a suitably shaped depression 57 to contact the correspondingly shaped portion 58 of the adjusting screw 53. On its opposite face the spring button 56 is provided with a central reduced portion 59 about which one end of a helical spring 60 is seated. The spring is constructed to deliver a pressure of 80 lbs. when compressed from $1 \frac{5}{32}''$ to $1 \frac{1}{8}''$ in length. At its opposite end the helical spring 60 bears against the diaphragm lock nut 48.

The bonnet 52 is provided with one or more openings 61 by means of which the space above the diaphragm 46 is vented to and in open communication with the outer air.

Figure 12:
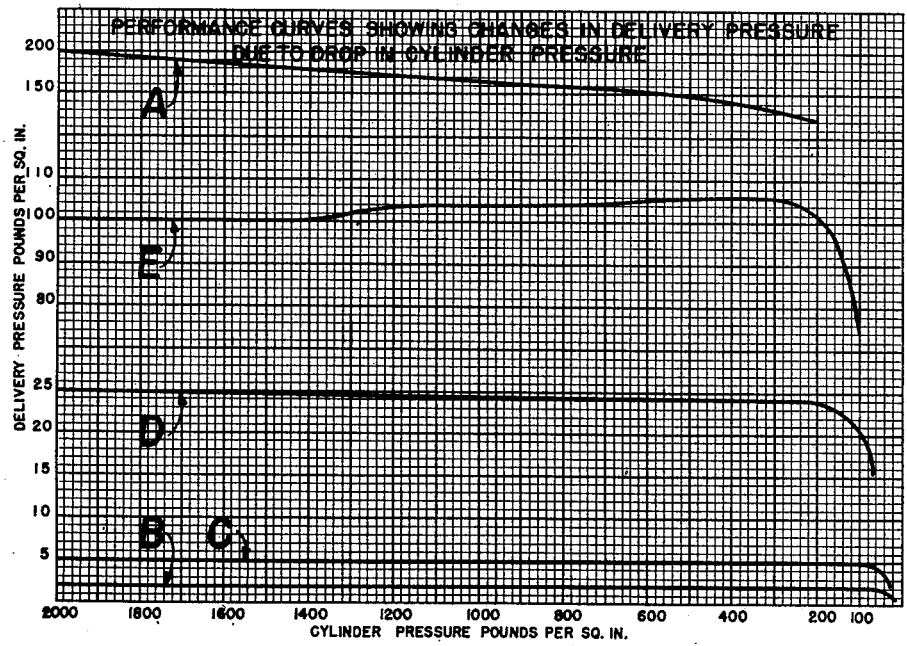
Figure 12 is a chart showing performance curves of the embodiment shown in Figure 1 regarding delivery pressures against a progressive drop in tank pressures.

This comprises the first stage regulator for pressure reduction, and it will be seen that the pressure in the nozzle, which is that of the tank, assists in opening the valve. With this arrangement of the port area, spring pressures and diaphragm area, the fall of pressure in the first stage as the tank's pressure falls is an approximately straight line function following the curve A in the graph shown in Figure 12.

From the interior of the boss 28 and from a point below the diaphragm 46, a duct 62 leads to an internally threaded opening which, as shown herewith, is closed by a safety relief valve plug 63 and a branch 62' of the duct 62 may be provided as terminating in a threaded opening to receive a pressure gauge, if desired. This gauge would then be in position to indicate the pressure within the first stage housing. For purposes of simplicity, the gauge has been indicated by the numeral 63' in Figure 1, same being optional equipment if it is ever desirable to remove the safety relief plug to provide an intermediate pressure hose connection.

Second stage pressure reduction

Leading also from the interior of the first stage housing 28 and from a point below the diaphragm 46, is a passage or duct 64 through which fluid may pass to a cavity 64' in the tapered portion 65 which forms a part of the central circular portion 87. As shown in Figure 5, the tapered portion 65 is open and internally threaded at one end as at 66. It is closed by a back cap 67 which is provided with a cavity having a cylindrical well 68 therein and with an externally threaded flange 69 which engages the threads 66 of the housing section 65. A spring 70 is mounted in the cap 67 upon the outer wall of the cylindrical well 68. The spring 70 is designed to exert 8 lbs. pressure when compressed from $\frac{21}{32}$" to ½" in length.

The cavity within the housing section 65 may be reduced and internally threaded as at 71 to receive the correspondingly threaded portion 72 of a hollow nozzle 73 which is provided with an enlarged laterally extending flange as shown in Figure 5. The nozzle 73 is provided with a reduced hollow portion having a valve port 74, whose inside diameter is .189" and whose outside diameter is $\frac{7}{16}$".

A center piece or shaft 75 extends through the nozzle 73 to operate at its outer end a seat portion 76 which is held in place by a seat retainer 77 internally threaded to receive the correspondingly threaded enlarged portion 78 of a guide member 79. The guide member 79 telescopes into and is held axially in place by the inner wall of the well 68 in the cap 67. The guide portion 79 may be slotted as at 80 to receive a tool for tightening in place. At its opposite end, the member 75 is threaded as at 81 beyond a stop flange or spacer formed upon the shank of the member 75. The threaded end 81 receives a diaphragm center piece 83, which may have a radially extending flange 84.

A perforated, ⅛" thick, diaphragm 85, 3 and $\frac{11}{32}$" in diameter, is received upon the portion 83 of the center piece and its outer edges are secured against a shoulder 86 formed in the diaphragm housing 87 beyond which the housing is internally threaded as at 88 to receive an outwardly threaded bonnet 89. The shoulder provides the diaphragm with a working area whose diameter is 2⅞".

Secured upon the center piece 83 is a diaphragm plate 90 which serves to support the diaphragm in place upon the center piece in cooperation with the portion 84 of the center piece, and also serves as an abutment for the diaphragm springs.

While any desired spring arrangement may be used with the diaphragm 85, to concentric helical springs of different lengths have been shown. In the embodiment shown in Figure 1, the inner spring 91 is the shorter and bears at one end upon a shoulder 92 formed in the diaphragm plate, the longer outside helical spring 93 bearing at one end against the diaphragm plate 90. The springs are spirally wound in opposite directions, to mutually guide each other without interlocking. At their opposite ends, both springs bear against a spring button 94 which may have a central boss 95 and is preferably indented or depressed on its opposite side as at 96 to receive a correspondingly shaped point or nose 97 of an adjusting plug 98, which is threaded as at 99 to engage corresponding threading in the bonnet 89, and which may carry at its outer end a handle 100, by means of which it may be rotated in and out to adjust the spring compression. The spring 91 is the same as spring 60, and the outer spring 93 exerts 200 lbs. of pressure when compressed from $1\frac{3}{32}$" to $\frac{29}{32}$".

The second stage regulator is one opening against the higher pressure, and with the arrangement shown regarding port area, spring balance and the working area of the diaphragm, the second stage pressure regulator increases its pressure output as the impressed pressure goes down. This functioning in combination with the functioning of the first stage regulator, see curve A, balances the variations encountered and provides the ultimate curves of B or C or D depending upon the pressure desired.

One or more ducts or passages 101 may be arranged as shown in Figure 5 extending from the interior of the housing portion 65 adjacent the member 75 and into the cavity within the housing portion 87.

Fluid from within the second stage regulator passes from that part of the housing enclosed by the housing section 87 through a discharge outlet 102 to a hollow bushing 103 to which may be connected any desired conduit means. As shown in section in Figure 5, a swivel nut 104 engages the outer end of the bushing 103 and removably holds in place a nipple 105 which carries a flange 106. The flange in turn, is engaged by an inwardly extending flange 107 on the swivel nut 104.

Gauges

A passage 108 also extends from the second stage regulator through a pipe or conduit 109 to the second stage gauge 110.

As above pointed out, the arrangement of gauges associated with the regulator of the present invention may be varied. Only the second stage gauge may be used, or, as above mentioned, a gauge may be used to indicate the first stage and one or both of these gauges may be omitted. Also, a gauge to indicate the cylinder or entering pressure may be used and such a gauge is shown in position in Figure 1 and the passage and connection for it is shown also in Figures 2, 3 and 4. Thus, there is formed within the housing section 111 a passage 112 to which a connection member 113 may be attached and to this a cylinder or inlet pressure gauge 114 may be secured.

Strainers

Auxiliary strainers or screens are shown in several places in the housing assembly and these are not described in detail. They might be used or omitted at will. It is ordinarily useful to have strainers interposed in the path ahead of the gauges so that foreign matter is excluded from the gauges. Such strainers are shown in plan in Figure 3.

High capacity, high pressure modification

Referring to Figures 9 and 10, the general arrangement of parts is the same, but by way of illustrating how the invention may be adapted to take care of extremely high pressures and heavy flow of as much as 6000 cubic feet per hour, the relative dimensions of the working parts are given herewith; The inside diameter of the nozzle port 31a is 13/64" and the outside diameter .250" with the margins curved to a .0235" radius. The back cap spring 38a is the same as spring 38. The spring 60a is the same as spring 93, and the diameter of the working area of the diaphragm 46a is approximately 1⅛". The output pressure progressively diminishes with progressive reduction in tank pressure in a manner similar to the curve A except at a much higher pressure range.

In the second stage the port 74a of the nozzle 73a has an inside diameter of 25/64" and an outside diameter of ½". The spring 70a is the same as springs 38 and 38a, the diameter of the working area of the diaphragm 85a is approximately 2⅛", and in this particular embodiment the outer spring 93a is the longer and has a load specification of 500 lbs. when compressed from 3" to 2". The inside spring is the shorter spring and exerts 124 lbs. when compressed from 1⅞" to 1 3/16". The inside spring operates to provide a fine adjustment for higher pressures. The increase of output pressure afforded by the second stage valve opening balances the decrease of the first stage and the ultimate performance curve of the two stages working together is shown by the curve E in Figure 12 for a given pressure setting of 100 lbs. per square inch for a flow of 1500 cu. ft. per hour.

The gradual climb shown in the curve of output pressure is desirable in cutting operations. The character of the curve can be changed to fit other uses by reducing slightly the size of the orifice of the second stage nozzle if the curve E is to be levelled.

Operation

In the assembly of the regulator, the bonnet screws 53 and 53a are tightened all the way down and locked in place. This provides an output pressure for the first stage regulator of 150 lbs. per square inch where the applied pressure is approximately 650 lbs. for the embodiment in Figure 1 and 450 lbs. per square inch in the embodiment illustrated in Figures 9 and 10 where the applied pressure is approximately 1200 lbs. Thereafter, when placed in use the performance curves as shown and described are attained for the various settings desired for output pressure.

Seat ignition control

Experience has shown that notwithstanding the normally slight opening between the nozzle and seat member under resting conditions, fire and further hazards occur in connection with regulators when the gas entering under high pressure at the time that it is turned on, rushes into the regulator with such violence that it compresses atmospheric oxygen or other oxygen and any other combustible vapors present with great suddenness. This sudden impact or pressure may produce sufficiently high temperatures especially if the passages are relatively narrow, to cause the oxygen or other gases in the system to be so rapidly compressed that they are raised by the heat of compression to a temperature sufficient to cause ignition. It has been mentioned that one of the objects of the present invention is to control and prevent this, and the construction and arrangement shown does so.

In the first place the distance between the strainer assembly and the first stage reduction nozzle 30 is as short as possible. This minimizes the quantity of free gases which are compressed ahead of the incoming surge of rapidly released high pressure gases such as oxygen. The volume of uncontrolled gases is only that of the short passages 25 and 26. By this arrangement, it is doubtful that sufficient heat is present in the body of gases of these short passages to be concentrated sufficiently without absorption into the walls of the conduits to cause seat ignition.

However, by way of being quite safe, the filter is so fashioned as to provide a circuitous flow for the incoming high pressure gases sufficient to turbulate the gases to prevent concentration of heat and to the compression exerted thereby against the gas in the conduits 25 and 26. This prevents stratification which is a contributing factor and permits time for adequate absorption of heat by the side walls. In this regard, split hundredths of seconds delay are important.

In the second place, the gases available for hot compression other than those in the conduits 25 and 26, have to pass through the circuitous arrangement of the strainer assembly where dangerous heat is absorbed by the strainer from the compressed hot gases. This relieves the seat at the nozzle 30 from any danger of excessive heat being in the secondary strata of gases compressed ultimately in the conduits 25 and 26. Moreover, in view of the fact that some advantage is gained in the size of the strainer compartment, compression of heat laden gases is by-passed to remote parts of the compartment where ignition heat is absorbed by metal or fire proof elements. Thus the ignition hazard at the first stage seat is eliminated.

The device so constructed and arranged as shown thus produces sufficient delay in compression and a wide diffusion, not only of the gases present in the system when the gas supply is turned on, but also of gas entering the system, that dangerous temperatures are prevented and in this connection it may be of interest to note that further factors of safety may be attained by any arrangement locating a flow delay means in close proximity to the first stage reduction nozzle. Absorption of dangerous heat is not only assisted by having as little heat as possible, but the smaller the quantity of heat present the easier will be the function of surrounding parts absorbing excessive heat particularly if the compression is delayed sufficiently to give enough time for absorption to take place.

Assembly, repair and weight

The various valve seats and nozzles are all available for simple and ready removal or adjustment from the exterior without otherwise disassembling the apparatus as a whole. The nozzle 30 and the valve seat 39 can thus be quite readily removed by the removal of the cap 33 and the member 37 which removes the valve seat and makes the nozzle available for removal. Similarly the nozzle 73 and the valve parts associated with it can be readily removed by removal of the cap 67, which then makes available the member 79 with its groove 80 and by means of which the valve seat member 76 and the stem 75 can be removed, and the removal of these makes available from the exterior the nozzle member 73.

The arrangement of the various chambers and conduits and passages in the body is such as to economize the space occupied by the device as a whole. Thus the boss 7 which houses the removable strainer assembly is situated directly in rear of the second stage regulation chamber as close to the first stage nozzle as possible and is formed integrally with the taper which defines the rear of that regulator body. It thus lies across the body and within the approximate total front to rear distance necessary for the second stage regulation chamber as a whole. In Figures 2, 3 and 5 it will be seen that this boss lies substantially within the margin of the body of the second stage regulator.

It will also be seen from these figures that the first stage regulator boss 28 is positioned at right angles to the boss 7 that contains the removable strainer assembly and that it lies substantially within the margin of the second stage regulator housing. Thus these two additional bosses are so grouped with respect to the housing necessary for the second stage regulator, that the overall size of the total device is for all practical purposes not increased by the presence of these two other essential housings. This arrangement thus reduces the size of the apparatus and the quantity and weight of metal necessary to make the whole regulator.

Having thus described the present invention, it will be apparent that the objects stated and provided for by the invention are accomplished thereby, and, although throughout the specification and drawings, various constants and dimensions have been discussed for purposes of illustration, these may be varied for different reasons if compensatory changes are made in other parts. Consequently, although certain preferred embodiments of the present invention have been shown and described, it will be apparent to those skilled in the art that various uses, modifications and changes can be made without departing from the spirit and substance of the invention, the scope of which is commensurate with the appended claims.

What is claimed is:

1. In combination in a double-stage regulator, means adapted to accomplish a two-stage reduction in pressure of the fluid passing through said regulator, said means comprising a relatively large second stage chamber, a relatively large second stage diaphragm therein, a relatively smaller first stage chamber in communication with the second stage chamber, a relatively smaller first stage diaphragm therein, valves cooperating with said diaphragms for controlling flow through the regulator the last mentioned chamber being arranged generally within the diameter of said first mentioned chamber and within its overall length, said first chamber positioned in an axial plane at right angles to the axial plane of said second stage chamber.

2. In a double stage regulator, an integral body, a second stage chamber therein opening outwardly to receive a diaphragm upon one side, a first stage compartment in said body of a length capable of receiving a diaphragm and a valve opening with the flow of fluid through a valve portion in an integral bridge in said compartment, said compartment being disposed behind the second stage chamber and to one side of the center thereof with the diaphragm receiving portions disposed at an angle with respect to each other, one substantially within the planar projection of the other.

3. In a double stage regulator, an integral body, a second stage chamber therein opening outwardly and having a valve-carrying diaphragm upon one side thereof, a first stage chamber in said body behind and having a wall in common with the second stage chamber, a passageway leading to the first stage chamber through a portion integral with the body, a valve controlling diaphragm in the first stage chamber exposed to atmosphere upon one side thereof a valve for said diaphragm, and a passageway connecting the two chambers through said common wall.

4. A forged regulator body comprising a substantially circular disk-like central portion tapering outwardly upon the back side thereof, an elongated L-shaped integral boss disposed at one side of and merging into the tapered portion and coming substantially within the diameter of the central portion and within the overall length of the body and tapered portion.

5. In combination in a double stage regulator, two independent pressure regulating valve assemblies comprising a housing comprising a relatively large second stage chamber closed by a diaphragm and a manually adjustable bonnet assembly for controlling the operation of the diaphragm, a relatively smaller first stage chamber in combination with said second stage chamber and having a diaphragm operated valve therein, and a screen assembly chamber having a screen therein separate from said first and second stage chambers but in communication with the first stage chamber, the two last mentioned chambers being arranged generally within the diameter of said first mentioned chamber and within its overall length, the main longitudinal axis of said first stage chamber and of said screen assembly chamber positioned at right angles to the main longitudinal axis of said second stage chamber.

6. In combination in a double stage regulator, two independent pressure regulating valve assemblies comprising a housing having a relatively large second stage chamber closed by a diaphragm disposed in one plane, a relatively smaller first stage chamber including a diaphragm disposed in another plane at an angle to the first and communicating with the first stage chamber, valves cooperating with said diaphragms for controlling flow through the regulator and a screen assembly chamber having a screen therein and disposed close to and in communication with said first stage chamber at the back of second stage chamber, the two last mentioned chambers being arranged generally within the diameter of said first mentioned chamber and within its overall length.

7. In a two-stage regulator, an integral body, two communicating independent pressure regulating valve compartments for first and second stage reduction disposed in said body both having their greatest dimensions disposed in parallel planes, the lesser within a projection of the greater, and having both their lesser dimensions within a projection of the greater thereof, bridge means interconnecting the walls of one of the compartments intermediate its ends to provide a passageway terminating in a port in said compartment a valve carrying yoke extending around said bridge, controlled by a diaphragm disposed on the side of the bridge opposite said port, a valve for said second stage compartment, and screen means disposed within said greater projections and in communication with said first stage compartment.

8. In combination in a multi-stage regulator, a housing comprising a relatively large second stage chamber, a relatively smaller first stage chamber in communication therewith and a screen assembly chamber, separate from said first and second stage chambers but in communication with said first stage chamber, the two last mentioned chambers being arranged generally within the diameter of said first mentioned chamber and within its overall length, the main longitudinal axis of said first stage chamber and of said screen assembly chamber being positioned perpendicular to each other and at right angles to the main longitudinal axis of said second chamber.

9. In combination in a multi-stage regulator for oxygen, a housing comprising a relatively large second stage chamber, a relatively smaller first stage chamber communicating therewith, valves for said chambers, and a conduit to the first stage chamber running substantially parallel with the plane of the second stage chamber including a mixer disposed in the conduit proximate to the first stage chamber and an element having a circuitous passageway for inhibiting the flow of unbalanced pressures through the conduit, the last mentioned chamber being arranged generally within the diameter of said first mentioned chamber and within its overall length, and the main longitudinal axis of said first stage chamber.

10. In combination in a two stage regulator, two independent pressure regulating assemblies including a unitary housing comprising a relatively large second stage chamber, a relatively smaller first stage chamber in communication therewith, a valve assembly in each of said first and second stage chambers, and a screen assembly chamber, separate from said first and second stage chambers but in communication with said first stage chamber and having a screen therein, the two last mentioned chambers being arranged generally within the diameter of said first mentioned chamber and within its overall length, the main longitudinal axis of said first stage chamber and of said screen assembly chamber being positioned perpendicular to each other and at right angles to the main longitudinal axis of said second stage chamber.

11. An oxygen regulator comprising a unitary body portion, a valve compartment in the body, a nozzle in the compartment having a conduit therethrough, an organic valve seat member co-operating with the nozzle, means for operating the seat with respect to the nozzle including a diaphragm, a passageway in the body leading directly to the inside of the nozzle and terminating at and in communication with said conduit, said passageway being adapted to be connected to a source of oxygen under extreme pressure, a combination mixer and filter disposed in the passageway proximate to the nozzle to turbulate incoming oxygen and disperse stratification of gases already in the passage including an element which inhibits the flow of said oxygen.

12. An oxygen regulator comprising a unitary body portion, a valve compartment in the body, a nozzle discharging into the compartment, an organic valve-seat member cooperating with the nozzle, means for supporting the seat in close proximity with slight clearance with respect to the nozzle including a diaphragm responsive to pressures of oxygen discharged by the nozzle, for closing the nozzle opening and a resilient element urging the seat member away from the nozzle, a conduit formed in the body leading directly to the inside of the nozzle and adapted to be connected to a source of oxygen under pressure, and means in said conduit proximate to the nozzle for retarding the compressive action of suddenly applied oxygen pressures including an element creating a turbulence that disperses stratification of gases present in the conduit, a screen and a circuitous passageway.

13. A forged two-stage regulator body comprising a substantially circular disk-like central portion tapering outwardly upon the back side thereof, an elongated integral boss disposed at one side of and merging with the central portion and the taper portion, a second elongated integral boss disposed upon another side and connecting with the first boss, said bosses being disposed perpendicular with respect to each other and coming substantially within the overall dimensions of said central portion.

14. A regulator comprising a body having a shallow valve reduction chamber therein, a boss behind and to one side of the center line of the chamber having an inlet passage therethrough, a second boss at the end of the first having a valve compartment in communication with said inlet passage and a passage through the wall separating the chamber and compartment, and vertical bosses at each side of the chamber adapted to be apertured to receive gauges with passages leading respectively to the inlet passage, the chamber and the compartment.

15. In a double stage regulator, an integral body, a second stage chamber therein opening outwardly in a wide mouth marginally conformed to receive a diaphragm thereagainst in sealed relationship, a first stage chamber in said body communicating with the second stage chamber and of a length capable of receiving a diaphragm and a valve member carried thereby, diaphragm operated valves in said chambers, an integral bridge in said first stage chamber having an inlet passageway therein terminating in a valve port opening away from the first stage diaphragm into the first stage chamber, the first stage chamber being disposed behind the second stage chamber with the inlet passageway and bridge disposed substantially parallel with the second stage diaphragm, one chamber being substantially within the planar projection of the other, and means for conducting fluid under high pressure through the body to the inlet passageway from an opening remote from said port including a third chamber in said body proximate to and within the overall dimensions of the first two chambers mentioned.

16. In a double stage regulator, a forged body comprising a second stage chamber opening outwardly to receive a diaphragm upon one side of a central portion and opening through the central portion to receive a back cap, said chamber being characterized by a wall defining a wide mouth receiving the diaphragm to seal a shallow depression a first stage chamber in communication with the second stage chamber disposed upon the other side of the central portion with a wall in common with the first mentioned wall and open at both ends to receive a diaphragm and a back cap, one chamber being substantially within the overall dimension of the other and having an inlet passageway terminating in a port within the first stage chamber, a boss upon the forged body disposed adjacent the opening through the central portion, said boss having a compartment therein through which fluid under high pressure is conveyed to the inlet passageway, said compartment being within the overall dimension of the two chambers mentioned and disposed with its longitudinal dimension substantially at right angles to the first stage chamber.

17. In a double stage regulator, an integral body comprising a wall defining a cavity upon one side thereof opening outwardly to provide a shallow depression bounded by an edge conformed to receive a diaphragm and a bonnet, a first stage pressure reduction chamber disposed against said wall with its axis disposed laterally of the axis of said cavity, said chamber being adapted to receive a diaphragm and bonnet, a valve port opening into the cavity, conduit means extending through the wall and connecting said port with the first stage chamber, a valve port opening into the first stage chamber, and means for conducting fluid under high pressure through the body to the last mentioned valve port including a compartment proximate to and within the overall dimension of the cavity and chamber.

18. The device defined in claim 17 wherein the compartment is adapted to receive a filter device and is disposed with its major dimension substantially at right angles to the axis of the first stage regulator and parallel with the diaphragm received in said cavity.

19. The device denfied in claim 17 wherein the compartment is in communication with a high pressure connection remote from the chamber mentioned and is accessible through an opening other than said connection and said chamber.

20. In a double stage regulator, an integral body, a second stage chamber therein opening outwardly and having a valve-carrying diaphragm upon one side thereof, said body having an opening therethrough to receive a back cap upon the other side, a first stage chamber behind and to one side of said back cap and at right angles to the axis of said opening and having a wall in common with the second stage chamber, a passageway leading to the first stage through a portion integral with the body, a valve controlling diaphragm in the first stage chamber exposed to atmosphere upon one side thereof, and a passageway connecting the two chambers through said common wall.

21. In a double stage regulator, an integral body, a second stage chamber therein opening outwardly and having a valve-carrying diaphragm upon one side and having a valve port centrally thereof, a first stage chamber behind and to one side of the center of the second stage chamber and at right angles to the axis thereof, said chambers having a wall in common between them, a passageway leading to the first stage through a portion integral with the body, a valve controlling diaphragm in the first stage chamber, and a passageway through said common wall connecting the chambers through said valve port.

WILLIAM C. BUTTNER.